(12) United States Patent
Lin (10) Patent No.: US 10,161,539 B1
(45) Date of Patent: Dec. 25, 2018

(54) MOTOR WATER VALVE

(71) Applicant: Hui-Huang Lin, Changhua (TW)

(72) Inventor: Hui-Huang Lin, Changhua (TW)

( * ) Notice: Subject to any disclaimer, the term of this patent is extended or adjusted under 35 U.S.C. 154(b) by 0 days.

(21) Appl. No.: 15/723,610

(22) Filed: Oct. 3, 2017

(51) Int. Cl.
| F16K 31/04 | (2006.01) |
| F16K 5/04 | (2006.01) |
| F16K 5/02 | (2006.01) |
| F16K 31/53 | (2006.01) |

(52) U.S. Cl.
CPC .......... F16K 31/041 (2013.01); F16K 5/0214 (2013.01); F16K 5/0414 (2013.01); F16K 31/535 (2013.01)

(58) Field of Classification Search
CPC ...... F16K 3/041; F16K 5/0414; F16K 5/0214; F16K 31/5351
USPC .......... 251/129.04, 129.12, 288, 310
See application file for complete search history.

(56) References Cited

U.S. PATENT DOCUMENTS

| 4,365,646 | A | * | 12/1982 | Sandling | ............... | F16K 5/0292 |
| | | | | | | 137/375 |
| 4,902,945 | A | * | 2/1990 | Meades, Jr. | ............. | F16K 31/02 |
| | | | | | | 251/129.01 |
| 5,033,012 | A | * | 7/1991 | Wohld | ..................... | G07C 3/04 |
| | | | | | | 702/41 |
| 5,099,867 | A | * | 3/1992 | Emery | .................. | F16K 31/045 |
| | | | | | | 137/1 |
| 6,283,139 | B1 | * | 9/2001 | Symonds | ............. | A01G 25/165 |
| | | | | | | 137/78.3 |
| 6,561,481 | B1 | * | 5/2003 | Filonczuk | ............. | F16K 31/043 |
| | | | | | | 239/578 |
| 7,461,669 | B2 | * | 12/2008 | Jonte | ..................... | F16K 27/045 |
| | | | | | | 137/454.5 |
| 7,988,124 | B2 | * | 8/2011 | Watanabe | ............... | F16K 31/04 |
| | | | | | | 251/129.04 |
| 9,857,805 | B2 | * | 1/2018 | Halimi | .................... | G05D 16/20 |
| 2016/0163177 | A1 | * | 6/2016 | Klicpera | ................ | E03B 7/071 |
| | | | | | | 137/59 |
| 2016/0222640 | A1 | * | 8/2016 | Lin | .......................... | H02K 7/14 |

* cited by examiner

*Primary Examiner* — Matthew W Jellett
(74) *Attorney, Agent, or Firm* — Ding Yu Tan (57) ABSTRACT

A motor water valve is provided, the motor water valve can prevent a pressure of a fluid from being too great and prevent motor water valve from failing to function and leaking water, and the motor water valve can control a flow of the fluid flowing through a piping member so as to control in segments. In addition, the motor water valve is an intelligent water valve system which can be in communication with an application unit through wireless network to be remotely set up and operated so that a person can use the motor water valve even when they are not around.

10 Claims, 7 Drawing Sheets

MOTOR WATER VALVE

BACKGROUND OF THE INVENTION

Field of the Invention

The present invention relates to a motor water valve.

Description of the Prior Art

In the market, there is a type of electrical water valve, the electrical water valve is electrically connected or disconnected via an electromagnet to control a valve plate to linearly move between two relative positions so as to further block or communicate with a piping member. However, in this type of electrical water valve, when a pressure of a fluid is too great, the fluid breaks through the valve plate easily and communicates with the piping member; thus, the electrical water valve fails to function, and water starts to leak. In addition, the conventional electrical water valve can only actuate to block or communicate with the piping member, and the electrical water valve is unlike a water valve (for example, a faucet) which is operated manually to control a flow of the fluid flowing through the piping member. Moreover, when using the conventional electrical water valve, it requires a person to operate and set up in front of the electrical water valve; therefore, if the person is not around, the electrical water valve cannot be operated and set up.

The present invention has arisen to mitigate and/or obviate the afore-described disadvantages.

SUMMARY OF THE INVENTION

The major object of the present invention is to provide a motor water valve, which can prevent a pressure of a fluid from being too great and prevent motor water valve from failing to function and leaking water, and the motor water valve can control a flow of the fluid flowing through a piping member so as to control in segments. In addition, the motor water valve is an intelligent water valve system which can be in communication with an application unit through wireless network to be remotely set up and operated so that a person can use the motor water valve even when they are not around.

To achieve the above and other objects, a motor water valve is provided, including a main body, a piping member, a valve body, a motor, a decelerating gear set, an electrical control unit, a limitation device and a reset assembly. The piping member is disposed on the main body and includes an inlet, an outlet and a receiving room which communicate with each other. The valve body is arranged in the receiving room, a side wall of the valve body has a first valve hole, the first valve hole corresponds to one of the inlet and the outlet, a bottom of the valve body has a second valve hole, the valve body further has an actuating shaft, the actuating shaft is optionally rotatable between an open position and a closed position, when the actuating shaft rotates to the open position, an interior of the valve body communicates with the first valve hole and the second valve hole so that the inlet and the outlet communicate with the receiving room; and when the actuating shaft rotates to the closed position, the interior of the valve body is discommunicated from the first valve hole and the second valve hole so that the inlet and the outlet are discommunicated from the receiving room. The motor is assembled to the main body and has a driving shaft. The decelerating gear set at least includes a driving gear and an actuating gear, the driving gear and the actuating gear are rotatably connected to each other, the driving gear is disposed on the driving shaft, the actuating gear is disposed on the actuating shaft, and when the driving shaft rotates, the driving gear drives the actuating gear to decelerate and drive the actuating shaft to rotate. The electrical control unit is electrically connected to the motor to control the motor, the electrical control unit includes a remote control unit, and the remote control unit is in communication with an application unit via wireless network so that the application unit optionally controls the motor via the remote control unit. The limitation device is electrically connected to the electrical control unit, the electrical control unit has at least one preset angle, the limitation device is capable of detecting a rotation angle of the actuating shaft, when the rotation angle of the actuating shaft is equal to one of the at least one preset angle, the electrical control unit stops the motor. The reset assembly is electrically connected to the electrical control unit and includes a sensing member, the sensing member is arranged on one of the decelerating gear set and the main body, and when the sensing member senses that the actuating shaft rotates to the open position, the electrical control unit stops the motor.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Please refer to FIGS. 1 to 7 for a preferred embodiment of the present invention. A motor water valve 4 includes a main body 1, a piping member 2, a valve body 3, a motor 4, a decelerating gear set 5, an electrical control unit 6, a limitation device 7 and a reset assembly 8.

The piping member 2 is disposed on the main body 1 and includes an inlet 21, an outlet 22 and a receiving room 23 which communicate with each other.

The valve body 3 is arranged in the receiving room 23, a side wall of the valve body 3 has a first valve hole 31, the first valve hole 31 corresponds to one of the inlet 21 and the outlet 22, a bottom of the valve body 3 has a second valve hole 32, the valve body 3 further has an actuating shaft 33, the actuating shaft 33 is optionally rotatable between an open position and a closed position, when the actuating shaft 33 rotates to the open position, an interior of the valve body 3 communicates with the first valve hole 31 and the second valve hole 32 so that the inlet 21 and the outlet 22 communicate with the receiving room 23; and when the actuating shaft 33 rotates to the closed position, the interior of the valve body 3 is discommunicated from the first valve hole 31 and the second valve hole 32 so that the inlet 21 and the outlet 22 are discommunicated from the receiving room 23.

The motor 4 is assembled to the main body 1 and has a driving shaft 41.

The decelerating gear set 5 at least includes a driving gear 51 and an actuating gear 52, the driving gear 51 and the actuating gear 52 are rotatably connected to each other, the driving gear 51 is disposed on the driving shaft 41, the actuating gear 52 is disposed on the actuating shaft 33, and when the driving shaft 41 rotates, the driving gear 51 drives the actuating gear 52 to decelerate and drive the actuating shaft 33 to rotate.

The electrical control unit 6 is electrically connected to the motor 4 to control the motor 4, the electrical control unit 6 includes a remote control unit 63, the remote control unit 63 is in communication with an application unit 91 via wireless network so that the application unit 91 optionally controls the motor 4 via the remote control unit 63.

The limitation device 7 is electrically connected to the electrical control unit 6, the electrical control unit 6 has at least one preset angle, the limitation device 7 is capable of detecting a rotation angle of the actuating shaft 33, when the rotation angle of the actuating shaft 33 is equal to one of the at least one preset angle, the electrical control unit 6 stops the motor 4. Specifically, in this embodiment, three preset angles, for example, 20, 40 and 60 degrees, are preset in the electrical control unit. When, through the electrical control unit 6, one said preset angle of 40 degrees is set, if the rotation angle of the actuating shaft 33 is 40 degrees, the electrical control unit 6 stops the motor; therefore, through the electrical control unit 6, different preset angle can be set to control the rotation angle of the actuating shaft 33 according the different angles so as to adjust a flow of a fluid flowing through the piping member 2.

The reset assembly 8 is electrically connected to the electrical control unit 6 and includes a sensing member 81, the sensing member 81 is arranged on one of the decelerating gear set 5 and the main body 1, and when the sensing member 81 senses that the actuating shaft 33 rotates to the open position, the electrical control unit 6 stops the motor 4.

The limitation device 7 further includes a detecting component 71 and a marking unit 72, one of the detecting component 71 and the marking unit 72 is disposed on the main body 1, the other of the detecting component 71 and the marking unit 72 is disposed on the decelerating gear set 5, and when the decelerating gear set 5 rotates, the detecting component 71 detects relative positions of the marking unit 72 and the detecting component 71 so as to calculate the rotation angle of the actuating shaft 33. Specifically, in other embodiments, the limitation device 7 may also be used to detect a number of circles that the driving shaft 41 of the motor 4 rotates so as to adjust the rotation angle of the actuating shaft 33 and also to adjust the flow of the fluid flowing through the piping member 2.

The marking unit 72 includes a plurality of profile grooves 721 which are spacingly formed on the actuating gear 52, the detecting component 71 is a light sensor, when the actuating gear 52 rotates, the detecting component 71 detects a number of the at least one profile groove 721 which passes a detecting end of the detecting component 71 so as to calculate the rotation angle of the actuating shaft 33, the electrical control unit 6 is a circuit board 61, and the detecting component 71 is disposed on the circuit board 61 and relatively above the actuating gear 52.

Specifically, the sensing member 81 is disposed on the circuit board 61, the reset assembly 8 further includes a block member 82, the block member 82 is disposed on a side of the actuating gear 52 facing the circuit board 61, and when the sensing member 81 senses the block member 82, the electrical control unit 6 stops the motor 4. The reset assembly 8 can prevent the actuating gear 52 from over-rotating to exceed the open position so as to prevent the valve body 3 from failing to control the flow accurately.

The decelerating gear further includes at least one driven gear 53, the at least one driven gear 53 is rotatably connected to and between the driving gear 51 and the actuating gear 52 so as to be driven by the driving gear 51 and drive the actuating gear 52 so that the actuating gear 52 is smaller than the driving gear 51 in rotation speed. The main body 1 further includes a substrate 11, the driving gear 51 and the actuating gear 52 are pivoted to the substrate 11, the actuating gear 52 has a sleeve portion 521, and the sleeve portion 521 is non-rotatably sleeved on the actuating shaft 33 so as to drive the actuating shaft 33 smoothly.

The application unit 91 is an App which is installed in a mobile device 9, the application unit 91 has a timing feature, and the timing feature optionally controls when in a day that the motor 4 actuates.

The motor water valve further includes a reminding module 64, the reminding module 64 is electrically connected to the electrical control unit 6, when the motor 4 starts, the reminding module 64 sends a reminding message, the reminding module 64 includes at least one of a light-emitting component, a sound-producing component and a screen.

The electrical control unit 6 further includes a button 65, the button 65 is movable between a first position and a second position, when the button 65 is on the first position, the motor 4 starts, and when the button 65 is on the second position, the motor 4 stops.

The electrical control unit 6 further includes an examining module 66, and the examining module 66 is used to examine at least one of a flow and a pH value of the fluid flowing through the piping member 2 and sends data result to the application unit 91; the examining module 66 further includes a thermometer 67, the thermometer 67 is for measuring a temperature of a outside, and when the temperature of the outside is greater than a preset temperature, the electrical control unit 6 controls the actuating shaft 33 to move to the open position.

Figure 1:
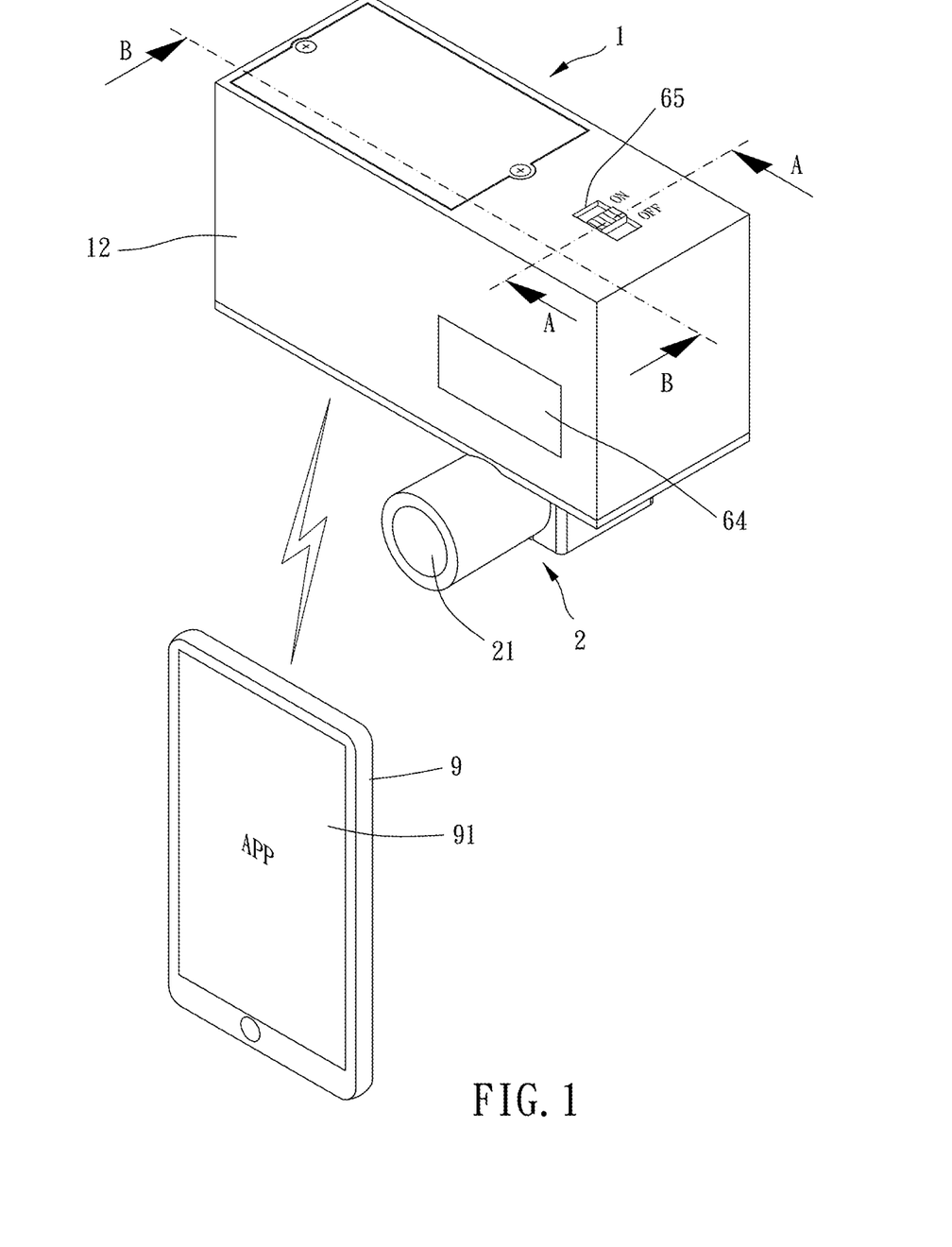
FIG. 1 is a stereogram of a preferred embodiment of the present invention.
Figure 2:
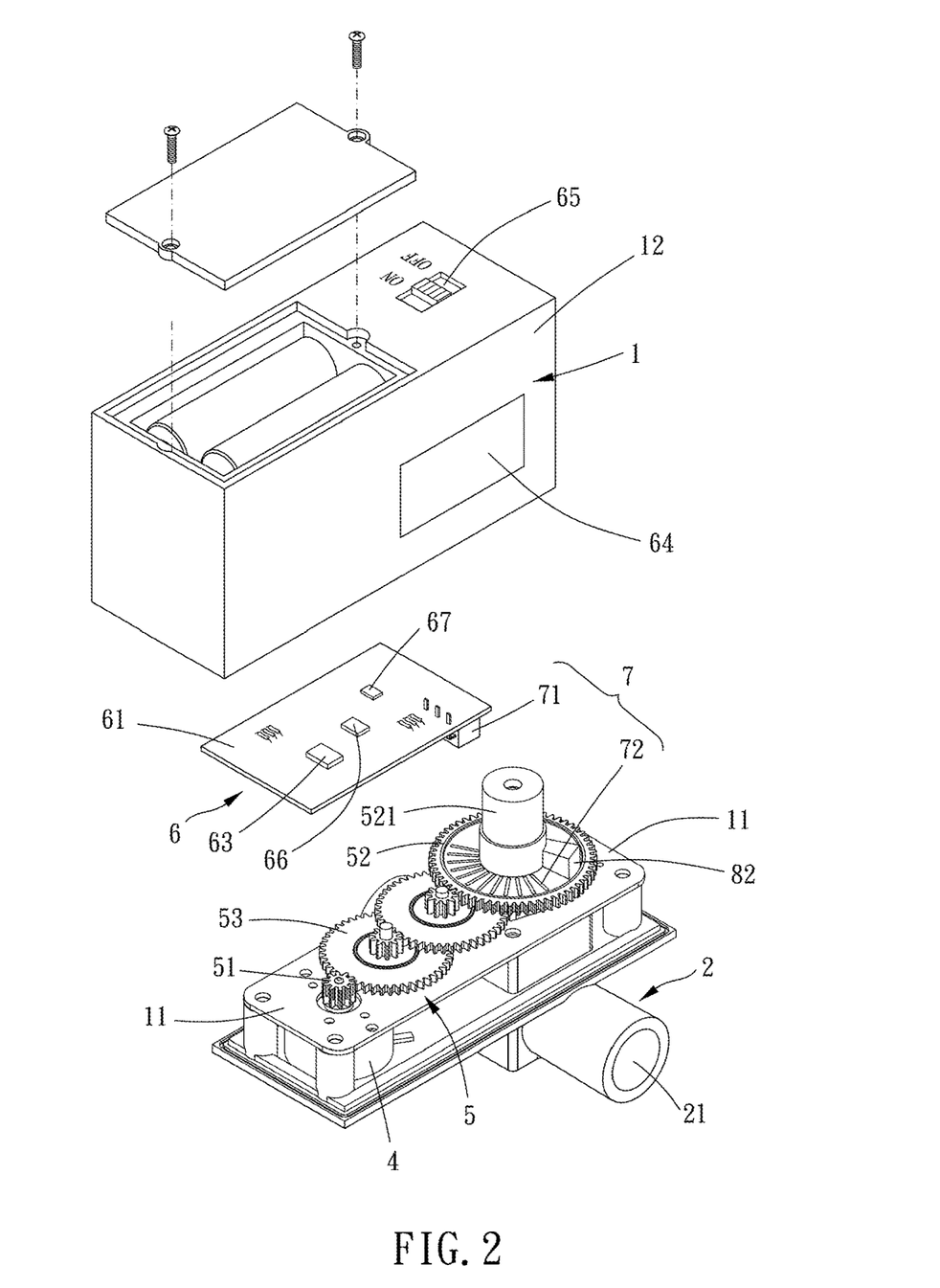
FIG. 2 is a breakdown view of the preferred embodiment of the present invention.
Figure 3:
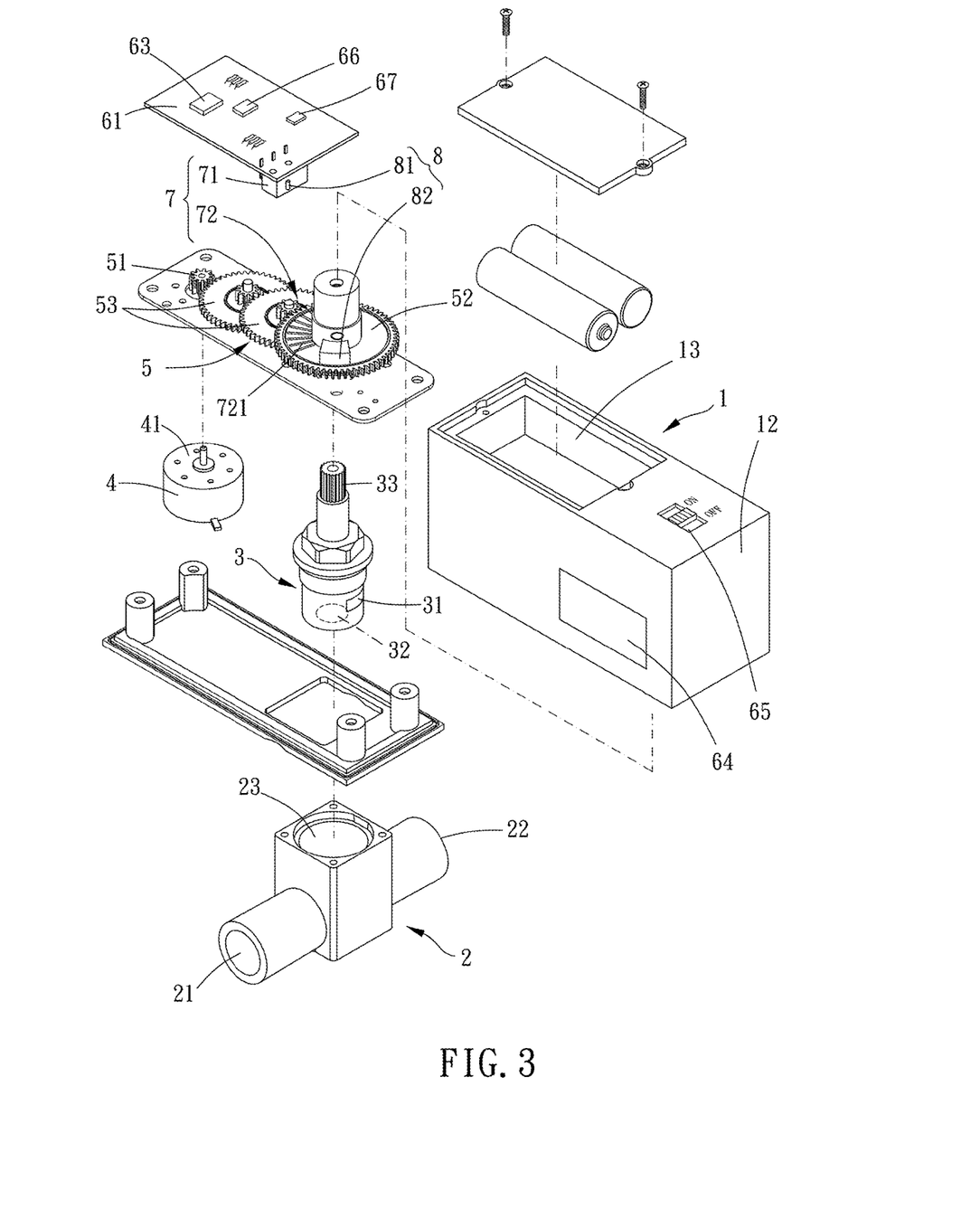
FIG. 3 is another breakdown view of the preferred embodiment of the present invention.
Figure 4:
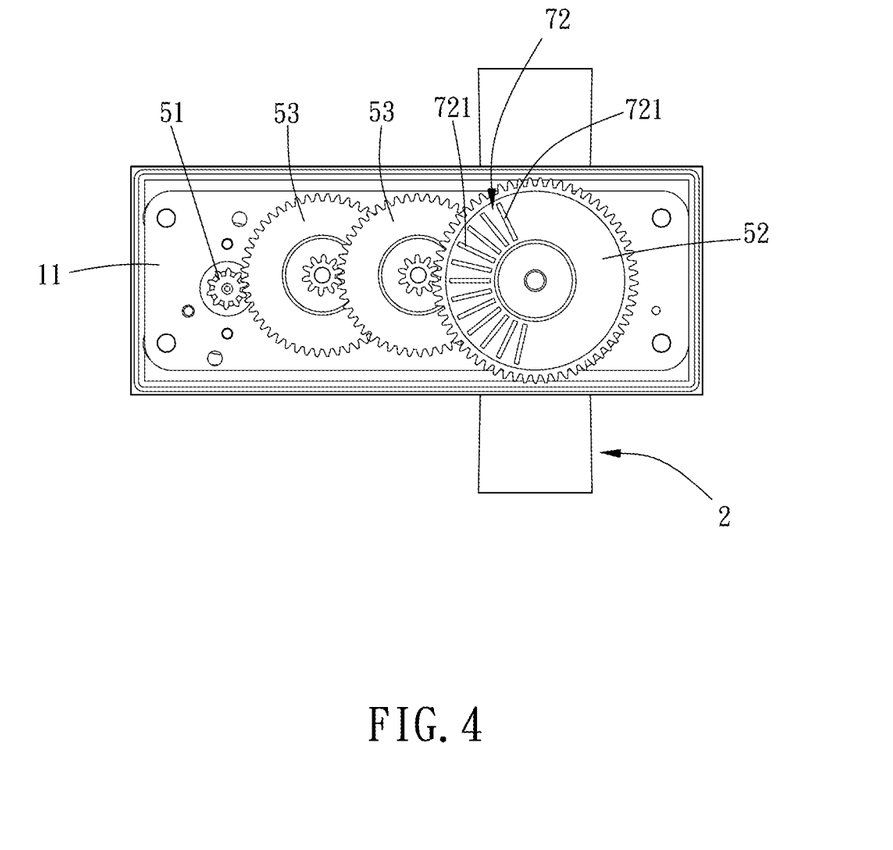
FIG. 4 is a partial top view of the preferred embodiment of the present invention.
Figure 5:
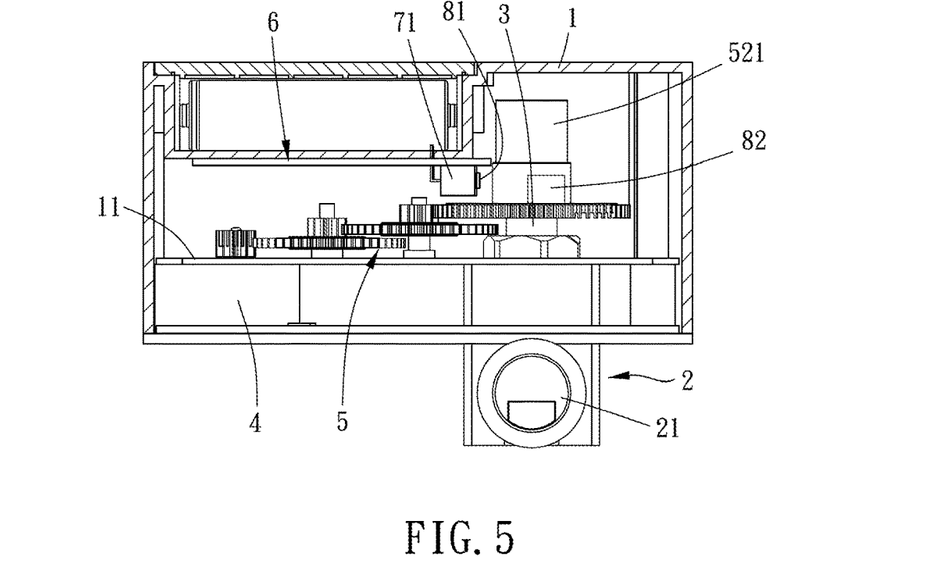
FIGS. 5 and 6 are cross-sectional views showing an operation of the present invention, taken along line B-B of FIG. 1.
Figure 6:
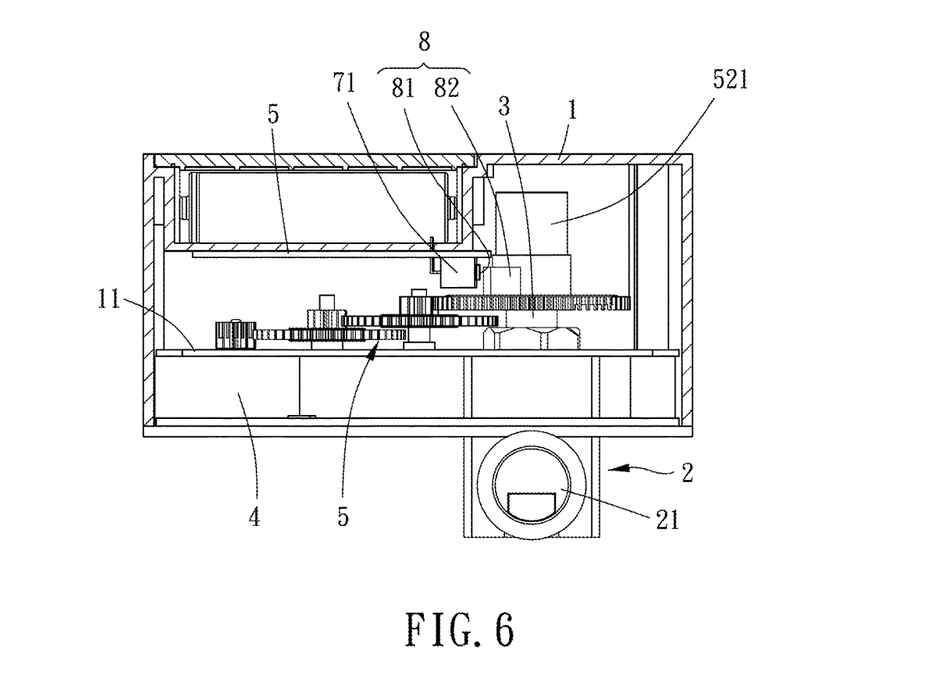
Figure 7:
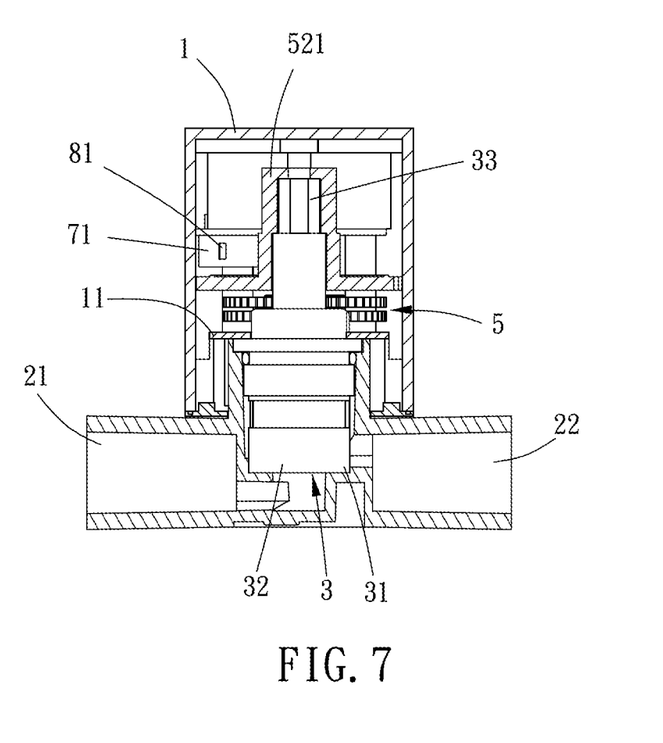
FIG. 7 is a cross-sectional view, taken along line A-A of FIG. 1.
Figure 8:
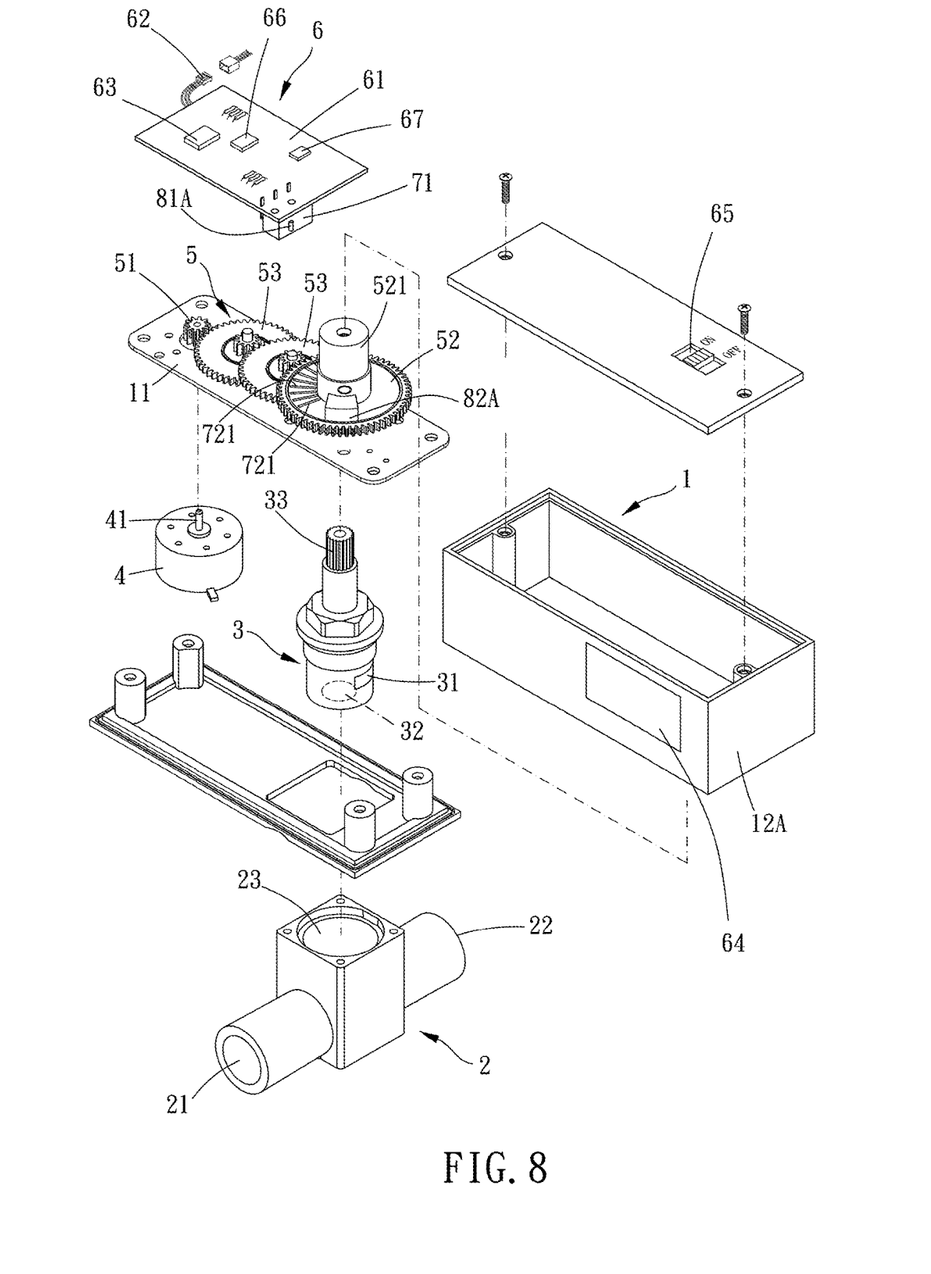
FIG. 8 is a breakdown view of another preferred embodiment of the present invention.

In this embodiment, the main body 1 includes a shell 12, the motor 4, the decelerating gear set, the electrical control unit 6 and the limitation device 7 are arranged in the shell 12, the shell 12 further has a receiving groove 13 for a power to be received therein, and the power is for being electrically connected to the electrical control unit 6. Please refer to FIG. 8 for another embodiment, the electrical control unit 6 further has a power connector 62 which is electrically connected to a power outside, so there is no need of additional batteries, and a volume of a shell 12A can be largely decreased.

While we have shown and described various embodiments in accordance with the present invention, it should be clear to those skilled in the art that further embodiments may be made without departing from the scope of the present invention.

What is claimed is:

1. A motor water valve, including:
 a main body;
 a piping member, disposed on the main body and including an inlet, an outlet and a receiving room which communicate with each other;
 a valve body, arranged in the receiving room, a side wall of the valve body having a first valve hole, the first valve hole corresponding to one of the inlet and the outlet, a bottom of the valve body having a second valve hole, the valve body further having an actuating shaft, the actuating shaft being optionally rotatable between an open position and a closed position, when the actuating shaft rotates to the open position, an interior of the valve body communicates with the first valve hole and the second valve hole so that the inlet and the outlet communicate with the receiving room; when the actuating shaft rotates to the closed position, the interior of the valve body is discommunicated from the first valve hole and the second valve hole so that the inlet and the outlet are discommunicated from the receiving room;
 a motor, assembled to the main body and having a driving shaft;
 a decelerating gear set, at least including a driving gear and an actuating gear, the driving gear and the actuating gear being rotatably connected to each other, the driving gear being disposed on the driving shaft, the actuating gear being disposed on the actuating shaft, when the driving shaft rotates, the driving gear drives the actuating gear to decelerate and drive the actuating shaft to rotate;
 an electrical control unit, electrically connected to the motor to control the motor, the electrical control unit including a remote control unit, the remote control unit being in communication with an application unit via wireless network so that the application unit optionally controls the motor via the remote control unit;
 a limitation device, electrically connected to the electrical control unit, the electrical control unit having at least one preset angle, the limitation device being capable of detecting a rotation angle of the actuating shaft, when the rotation angle of the actuating shaft is equal to one of the at least one preset angle, the electrical control unit stops the motor;
 a reset assembly, electrically connected to the electrical control unit, including a sensing member, the sensing member being arranged on one of the decelerating gear set and the main body, when the sensing member senses that the actuating shaft rotates to the open position, the electrical control unit stops the motor.

2. The motor water valve of claim 1, wherein the limitation device further includes a detecting component and a marking unit, one of the detecting component and the marking unit is disposed on the main body, the other of the detecting component and the marking unit is disposed on the decelerating gear set, and when the decelerating gear set rotates, the detecting component detects relative positions of the marking unit and the detecting component so as to calculate the rotation angle of the actuating shaft.

3. The motor water valve of claim 2, wherein the marking unit includes a plurality of profile grooves which are spacingly formed on the actuating gear, the detecting component is a light sensor, when the actuating gear rotates, the detecting component detects a number of the at least one profile groove which passes a detecting end of the detecting component so as to calculate the rotation angle of the actuating shaft, the electrical control unit is a circuit board, and the detecting component is disposed on the circuit board and relatively above the actuating gear.

4. The motor water valve of claim 1, wherein the electrical control unit is a circuit board, the sensing member is disposed on the circuit board, the reset assembly further includes a block member, the block member is disposed on a side of the actuating gear facing the circuit board, when the actuating gear rotates to the open position, the sensing member senses the block member, and the electrical control unit stops the motor.

5. The motor water valve of claim 1, wherein the decelerating gear further includes at least one driven gear, the at least one driven gear is rotatably connected to and between the driving gear and the actuating gear so as to be driven by the driving gear and drive the actuating gear, the main body further includes a substrate, the driving gear and the actuating gear are pivoted to the substrate, the actuating gear has a sleeve portion, and the sleeve portion is non-rotatably sleeved on the actuating shaft.

6. The motor water valve of claim 1, wherein the application unit is an App which is installed in a mobile device, the application unit has a timing feature, and the timing feature optionally controls when in a day that the motor starts.

7. The motor water valve of claim 1, further including a reminding module, the reminding module being electrically connected to the electrical control unit, when the motor starts, the reminding module sends a reminding message, the reminding module including at least one of a light-emitting component, a sound-producing component and a screen.

8. The motor water valve of claim 1, wherein the electrical control unit further includes a button, the button is movable between a first position and a second position, when the button is on the first position, the motor starts, and when the button is on the second position, the motor stops.

9. The motor water valve of claim 1, wherein the electrical control unit further includes an examining module, and the examining module is used to examine at least one of a flow and a pH value of a fluid flowing through the piping member and sends data result to the application unit; the examining module further includes a thermometer, the thermometer is for measuring a temperature of outside, and when the temperature of the outside is greater than a preset temperature, the electrical control unit controls the actuating shaft to move to the open position.

10. The motor water valve of claim 1, wherein the main body includes a shell, the motor, the decelerating gear set, the electrical control unit and the limitation device are arranged in the shell, the shell further has a receiving groove for a power to be received therein, and the power is for being electrically connected to the electrical control unit.

* * * * *